United States Patent
Armbruster et al.

(10) Patent No.: US 8,510,069 B2
(45) Date of Patent: Aug. 13, 2013

(54) FEEDBACK APPARATUS AND FEEDBACK METHOD FOR CONTROLLING A SERVOMOTOR

(75) Inventors: Ulrich Armbruster, Donaueschingen (DE); Josef Siraky, Donaueschingen (DE)

(73) Assignee: Sick Stegmann GmbH, Donaueschingen (DE)

( * ) Notice: Subject to any disclaimer, the term of this patent is extended or adjusted under 35 U.S.C. 154(b) by 330 days.

(21) Appl. No.: 13/042,878

(22) Filed: Mar. 8, 2011

(65) Prior Publication Data

US 2011/0246113 A1 Oct. 6, 2011

(30) Foreign Application Priority Data

Mar. 31, 2010 (EP) .................................. 10003522

(51) Int. Cl.
 *G06F 19/00* (2011.01)
(52) U.S. Cl.
 USPC ............ 702/94; 702/186; 702/142; 318/560; 318/568.22; 318/568.17; 318/603; 318/815; 318/611; 318/592; 318/652
(58) Field of Classification Search
 USPC .................. 702/94, 186, 142; 318/432, 560, 318/466, 611, 727, 568.18, 568.22, 594, 318/716, 632, 568.17, 603, 815, 610, 592, 318/652; 700/177, 37, 193; 73/579
 See application file for complete search history.

(56) References Cited

U.S. PATENT DOCUMENTS

| 4,810,941 | A  | * | 3/1989  | Ohishi et al. ................. 388/815 |
| 5,304,907 | A  |   | 4/1994  | Abe et al. |
| 5,475,291 | A  | * | 12/1995 | Yoshida et al. .......... 318/568.22 |
| 5,886,491 | A  | * | 3/1999  | Yoshida et al. ............... 318/592 |
| 5,973,467 | A  | * | 10/1999 | Eguchi .......................... 318/609 |
| 6,127,793 | A  | * | 10/2000 | Kerner ......................... 318/561 |
| 6,236,182 | B1 | * | 5/2001  | Kerner ......................... 318/609 |
| 6,658,370 | B2 | * | 12/2003 | Christ et al. .................. 702/182 |
| 6,812,668 | B2 | * | 11/2004 | Akiyama ...................... 318/610 |
| 6,844,693 | B2 | * | 1/2005  | Tazawa et al. ............... 318/561 |
| 7,196,489 | B2 | * | 3/2007  | Taniguchi et al. ............ 318/652 |
| 8,135,977 | B2 | * | 3/2012  | Francescon et al. .......... 713/500 |
| 2003/0076060 | A1 |   | 4/2003 | Colosky et al. |

FOREIGN PATENT DOCUMENTS

| EP | 0 334 541 A1 | 9/1989 |
| GB | 2 252 845 A  | 8/1992 |

* cited by examiner

*Primary Examiner* — Carol S Tsai
(74) *Attorney, Agent, or Firm* — Nath, Goldberg & Meyer; Jerald L. Meyer

(57) ABSTRACT

A feedback system for controlling a servo motor comprising at least one rotary angle sensor and at least one rotary speed sensor, wherein the rotary angle sensor supplies a measured rotary angle value to a computer, wherein the rotary speed sensor supplies a measured rotary speed value to the computer, the actual rotary speed values are the measured rotary angle values interpolated according to the integrated measured rotary speed values, and wherein at high rotary speeds, the actual rotary speed values are the calibrated measured rotary angle values, differentiated with respect to time, and at low rotary speeds, the actual rotary speed values are the measured rotary speed values.

7 Claims, 1 Drawing Sheet

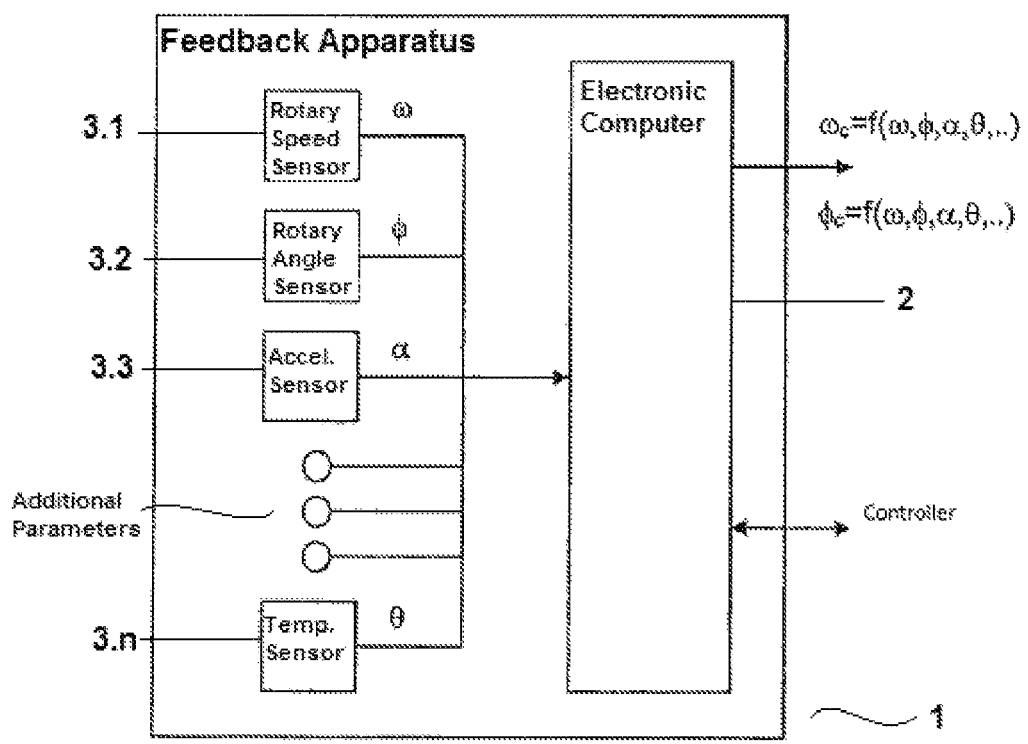

FEEDBACK APPARATUS AND FEEDBACK METHOD FOR CONTROLLING A SERVOMOTOR

BACKGROUND OF INVENTION

This disclosure claims the benefit of priority under 35 U.S.C. §119 to European Patent Application No. EP 10003522.9, which was filed on Mar. 31, 2010. The entire content of the cross-referenced European application is incorporated by reference herein.

1. Technical Field

The invention relates to a feedback apparatus and a feedback method for controlling a servo motor.

2. Related Art

Feedback systems are used for controlling electric servo motors. These systems perform the task of providing the actual data required for controlling speed and angular position.

Known feedback systems use rotary angle sensors (encoders) to measure angular position in absolute or incremental terms. Rotary angle sensors currently in use have a graduation, which is scanned optically, magnetically, inductively or capacitively. Each scan produces a sine signal and a cosine signal, which allow an interpolation of the graduation. With rotary angle sensors of this type, graduations having 1024 or 2048 periods per revolution are customary. Interpolation is then possible up to 14 bits per period. This results in angular resolutions for such rotary angle sensors of up to 25 bits per revolution.

The accuracy of rotary angle sensors that measure with such high resolution is dependent on the precision of the graduation. To control the rotary speed of the servo motor, the actual rotary speed is determined by determining the difference between rotary angle measurements. Errors in the differential and integral linearity of the graduation therefore lead to an increasing extent to errors in the actual rotary speed values provided by the feedback system. This can be disadvantageous particularly when the controller is adjusted to a high compliance level, i.e., it reacts very rapidly to changes in the actual value. Even if the servo motor is itself running at the set rotary speed, apparent fluctuations in rotary speed simulated by the nonlinearity of rotary angle measurement will be corrected by accelerations and decelerations of the servo motor, which can result in substantial losses in energy, particularly when larger masses are being driven. In conventional rotary angle sensors, this disadvantage can be diminished only by improving the differential and integral linearity of the graduation, which substantially increases the cost of producing the graduation.

State-of-the-art feedback systems that use rotary angle sensors of this type operate reliably at rotary speeds of up to about 12,000 revolutions per minute (rpm). At lower rotary speed ranges, for example at rotary speeds of <5 rpm, determining the actual rotary speed by determining the difference between angular position values becomes imprecise, because the angular resolution of the interpolation of the graduation periods is diminished.

It is further known to use rotary speed sensors for measuring the rotary speed of rotating objects. Such rotary speed sensors are preferably embodied as optical gyroscopes, for example, as fiber optic gyroscopes (fiber optic gyros) or as ring lasers (ring laser gyros). With optical gyroscopes of this type, the difference in time delay between a laser beam running in the direction of rotation and a laser beam running counter to the direction of rotation is used to determine rotary speed. As is described, for example, in EP 585 954 B1, the two laser beams are placed in interference, wherein the displacement of the interference pattern provides the measurement of rotary speed. Rotary speed sensors of this type, and particularly optical gyroscopes, permit a highly precise measurement of rotary speed. For example, rotary speed can be measured at a resolution of $<10^{-3}$ rpm. By integrating the rotary steed measurements over time, rotary angle position can be determined with corresponding accuracy.

One problem with optical gyroscopes is that their measurements are dependent on the inertial system in which the gyroscope is placed. Therefore, rotary speed measurements are always influenced by the earth's rotation, and in many applications these measurements can also be influenced by a possible rotation of the machine or the apparatus in which the gyroscope is placed. These factors must be corrected when determining rotary speed measurement. A further problem is that such gyroscopes frequently have substantial drift.

Measuring rotary speed over a displacement of the optical interference fringe pattern, in other words over a change in light intensity, results in measurement at higher rotary speeds becoming difficult. The measuring range for such optical gyroscopes is therefore limited to a maximum of about 100 rpm.

SUMMARY OF THE INVENTION

The problem addressed by the invention is that of providing a feedback system, i.e., a feedback apparatus and/or a feedback method, for controlling a servo motor, which improves and expands the range of control.

This problem is solved according to the invention by a feedback apparatus having the features of patent claim 1 and/or by a feedback method having the features of patent claim 7. Advantageous embodiments of the invention are specified in the sub-claims.

The invention provides a feedback system for controlling the rotary angle position and/or the rotary speed of an electric servo motor. The feedback system generates an actual value, which is supplied to the servo motor controller. Depending on the embodiment of the interface between the feedback system and the servo motor controller, the actual value can be provided as rotary speed data or as rotary angle data. If rotary angle data is transmitted, it can be differentiated in the controller with respect to time in order to obtain rotary speed data.

BRIEF DESCRIPTION OF THE DRAWINGS

FIG. 1 is a schematic view of the feedback system apparatus according to the first embodiment of the apparatus.

DETAILED DESCRIPTION OF A PREFERRED EMBODIMENT

As is illustrated schematically in FIG. 1, the feedback system has a feedback apparatus 1, which encompasses an electronic computer 2. The feedback apparatus 1 further has at least one rotary speed sensor 3.1 and one rotary angle sensor 3.2. The rotary speed sensor 3.1 supplies a measured rotary speed value $\omega$ to the computer 2. The rotary angle sensor 3.2 supplies a measured rotary angle value $\phi$ to the computer 2.

The rotary speed sensor 3.1 is preferably embodied as an optical gyroscope, for example, as a fiber optic gyroscope or a ring laser. A fiber optic gyroscope is preferable due to its high resolution and measuring precision, its sturdiness, its compact, lightweight structure, its ease of installation, its long service life and its low maintenance requirement. The rotary speed sensor 3.1 supplies a measured rotary speed value ω at a high rotary speed resolution, which can be about $10^{-3}$ rpm, for example. The measuring range in which the rotary speed sensor 3.1 can operate reliably lies between 0 rpm and a maximum of about 100 rpm.

The rotary angle sensor 3.2 is preferably a torque encoder with a periodic graduation. The graduation can have about 1024 or 2048 periods. Scanning the graduation provides one sine and one cosine signal per period. The sine and cosine signals can each be interpolated at a resolution of up to 14 bits per period. This results in a rotary angle measured value φ having a resolution of 24 to 25 bits per revolution being supplied to the computer 2.

The computer 2 generates the actual value for the servo motor controller as follows. At low rotary speeds of less than 5 rpm, for example, the measured rotary speed value ω is integrated over time to determine a reference rotary angle. This reference rotary angle has the high resolution and precision of the optical gyroscope. The rotary angle values φ measured by the rotary angle sensor 3.2 are compared with the reference rotary angles in the computer 2 to determine rotary angle correction values, which are stored in the computer 2. The rotary angle correction values are used to calibrate the measured rotary angle values φ supplied by the rotary angle sensor 3.2.

The integration over time of the measured rotary speed value ω to determine rotary angle is the basic mathematical principle of the algorithm used in the computer 2. However, additional corrections may also be made within the scope of the invention, which take into account potential deviations from a pure integration.

For instance, the computer 2 can provide calibrated rotary angle values $\phi_c$ as the actual value. These calibrated rotary angle values $\phi_c$ correspond to the measured rotary angle values φ from the rotary angle sensor 3.2, however the differential and integral linearity errors of the rotary angle sensor 3.2 are reduced as a result of calibration using the correction values. The rotary angle data for the actual value $\phi_c$ therefore have a linearity that corresponds to the accuracy of the integrated rotary speed measured values ω from the optical gyroscope.

For high rotary speeds above about 5 to 10 rpm, the calibrated rotary angle value $\phi_c$ is used as the actual value for the purpose of control. For controlling angular position, this calibrated rotary angle value $\phi_c$ is used directly as the actual value; for controlling rotary speed, the calibrated rotary angle value $\phi_c$ is differentiated with respect to time, to obtain a calibrated rotary speed value $\omega_c$.

At low rotary speeds below about 5 to 10 rpm, the rotary speed value ω measured by the rotary speed sensor 3.1 is provided as the actual rotary speed for the purpose of controlling rotary speed. Moreover, at these low rotary speeds, the measured rotary speed value ω from the rotary speed sensor 3.1, integrated over time, is used for interpolating the graduation periods of the measured rotary angle value φ. At these low rotary speeds, therefore, an actual rotary angle value having the high resolution of the rotary speed sensor 3.1 can also be provided. Because in this case the measured rotary speed value is used only for interpolating the graduation periods of the measured rotary angle value φ, offsets based on a rotating inertial system and drift of the rotary speed sensor 3.1 can be disregarded.

The transition from processing the measured rotary speed values ω from the rotary speed sensor 3.1 at low rotary speeds to processing the measured rotary angle values φ from the rotary angle sensor 3.2 at high rotary speeds preferably takes place continuously in the computer 2. In a transition region in the computer 2, measured rotary speed values ω are balanced against measured rotary angle values φ to ensure continuous adjustment of the measuring ranges.

Of course, additional parameters may also be taken into consideration in the computer 2. For example, an angular acceleration sensor 3.3 can also supply an acceleration measurement α to the computer 2. An acceleration sensor 3.3 of this type could also be optionally used in place of the rotary speed sensor 3.1, in which case integration over time of the angular acceleration measurement α would be necessary to determine rotary speed. Additionally, for example, a temperature sensor 3.n can supply a temperature measurement θ as an additional parameter to the computer 2. Parameters of the servo motor, such as its torque and power, can also be processed in the computer 2.

The feedback system according to the invention uses calibration by means of the rotary speed sensor to improve the differential and integral linearity for controlling rotary speed within the entire rotary speed range.

For angular position, the calibrated rotary angle value having the resolution of the rotary angle sensor 3.2 is provided., wherein the precision of the rotary angle value is improved through calibration.

At low rotary speeds, the highly precise measured rotary speed value from the rotary speed sensor 3.1 is provided as the actual rotary speed value.

Also within this low rotary speed range, an actual rotary angle value is provided, the resolution of which is determined by the precision of the rotary speed sensor.

The invention therefore enables an improvement in the control of a servo motor, particularly at high rotary speeds. The linearity of rotary speed measurement is improved, without requiring an improvement in the precision of the graduation. This allows the controller to operate at a higher compliance level. The feedback system according to the invention also expands the adjustment range of control to include lower rotary speeds.

The invention claimed is:

1. A feedback apparatus for controlling a servo motor, comprising at least one rotary angle sensor and at least one rotary speed sensor, wherein the rotary angle sensor supplies a rotary angle measured value to a computer, wherein the rotary speed sensor supplies a rotary speed measured value to the computer, wherein in the computer the rotary speed measured value is integrated to form reference rotary angles, wherein the reference rotary angles are compared with the rotary angle measured values calculate rotary angle correction values, wherein the rotary angle measured values are calibrated using the rotary angle correction values, wherein the computer provides actual rotary angle values and/or actual rotary speed values for control purposes, wherein at high rotary speeds, the actual rotary speed values are the calibrated measured rotary angle values, and at low rotary speeds, the actual rotary speed values are the rotary angle measurements interpolated according to the integrated rotary speed measurements, and wherein at high rotary speeds, the actual rotary speed values are the calibrated rotary angle measurements differentiated with respect to time, and at low rotary speeds, the actual rotary speed values are the measured rotary speed values.

2. The feedback apparatus according to claim 1, in which the rotary speed sensor is an optical gyroscope.

3. The feedback apparatuses according to claim 2, in which the optical gyroscope is a fiber optic gyroscope.

4. The feedback apparatus according to claim 1, in which the rotary angle sensor has a periodic graduation, which is scanned, generating sine and cosine signals, which are interpolated to obtain angle resolution.

5. The feedback apparatus according to claim 1, in which an angular acceleration sensor is additionally or optionally provided, which supplies angular acceleration measured values to the computer.

6. The feedback apparatus according to claim 1, in which a temperature sensor is additionally provided, which supplies temperature measurements to the computer.

7. A feedback method for controlling a servo motor, in which at least one rotary angle measured value and at least one rotary speed measured value are measured, in which the rotary speed measured value is integrated over time, in which the time integrated measured value is compared with the rotary angle measured value and in each case rotary angle correction values are calculated, in which the rotary angle measured values are corrected on the basis of the rotary angle correction values, in which actual rotary angle values and/or actual rotary speed values are provided for controlling the servo motor, wherein at high rotary speeds, the actual rotary angle values are the corrected rotary angle measured values, and at low rotary speeds, the actual rotary angle values are the integrated rotary speed measured values, and wherein at high rotary speeds, the actual rotary speed values are the corrected rotary angle measured values differentiated with respect to time, and at low speeds, the actual rotary speed values are the rotary speed measured values.

\* \* \* \* \*

UNITED STATES PATENT AND TRADEMARK OFFICE
CERTIFICATE OF CORRECTION

PATENT NO. : 8,510,069 B2
APPLICATION NO. : 13/042878
DATED : August 13, 2013
INVENTOR(S) : Armbruster et al.

It is certified that error appears in the above-identified patent and that said Letters Patent is hereby corrected as shown below:

In the Claims

- Claim 1, Column 4, Line 48, after "values" and before "calculate"

Please insert -- to --

Signed and Sealed this
Fifteenth Day of October, 2013

Teresa Stanek Rea
*Deputy Director of the United States Patent and Trademark Office*